United States Patent
Vlot et al.

(10) Patent No.: US 10,025,911 B2
(45) Date of Patent: Jul. 17, 2018

(54) REPLAY ATTACK PREVENTION FOR CONTENT STREAMING SYSTEM

(71) Applicant: Vodafone GmbH, Düsseldorf (DE)

(72) Inventors: Marnix Vlot, Düsseldorf (DE); Christoph Schaaf, Düsseldorf (DE)

(73) Assignee: VODAFONE GMBH (DE)

( * ) Notice: Subject to any disclaimer, the term of this patent is extended or adjusted under 35 U.S.C. 154(b) by 85 days.

(21) Appl. No.: 14/836,373

(22) Filed: Aug. 26, 2015

(65) Prior Publication Data

US 2016/0063220 A1    Mar. 3, 2016

(30) Foreign Application Priority Data

Aug. 28, 2014  (EP) .................................... 14182736

(51) Int. Cl.
  *G06F 21/10*  (2013.01)
  *H04L 29/06*  (2006.01)

(52) U.S. Cl.
  CPC .......... *G06F 21/10* (2013.01); *H04L 63/0428* (2013.01); *H04L 63/123* (2013.01); *G06F 2221/0724* (2013.01)

(58) Field of Classification Search
  CPC ..... G06F 21/10; G06F 21/602; H04L 9/0819; H04L 9/0869; H04L 63/0428–63/0464; H04L 2209/34; H04L 63/123
  See application file for complete search history.

(56) References Cited

U.S. PATENT DOCUMENTS

| | | | |
|---|---|---|---|
| 2002/0016919 A1* | 2/2002 | Sims, III | G06F 21/10 713/193 |
| 2002/0169970 A1* | 11/2002 | Candelore | H04L 9/3297 713/193 |
| 2009/0175442 A1* | 7/2009 | Feng | G06F 21/10 380/28 |
| 2015/0067754 A1* | 3/2015 | Wiser | H04N 21/2668 725/120 |

\* cited by examiner

*Primary Examiner* — Kevin Bechtel
(74) *Attorney, Agent, or Firm* — Innovation Counsel LLP (57) ABSTRACT

The invention relates to a method for accessing protected content provided to a client device, wherein the client device decrypts the content using at least one control word provided by a server device. In the method, (i) the client device sends a request message to the server device, the request message including a nonce, and the client device stores the nonce; (ii) upon receipt of the request message, the server device generates a control word message based on the control word and the received nonce; (iii) upon receipt of the control word message, the client device determines the control word from the control word message and validates the control word message using the stored nonce; and (iv) the client device uses the control word to decrypt at least part of the content in response to a successful validation of the control word message. Moreover, the invention relates to a client device and a server device for carrying out the method.

12 Claims, 1 Drawing Sheet

REPLAY ATTACK PREVENTION FOR CONTENT STREAMING SYSTEM

CROSS-REFERENCE TO RELATED APPLICATIONS

This application claims benefit of priority to European Patent Application No. EP14182736 filed on Aug. 28, 2014, the entire contents of which is incorporated herein by reference.

DESCRIPTION

The invention relates to content protections systems which particularly allow for streaming content from a server to a client device. More specifically, the invention relates to a method for accessing protected content provided to a client device, wherein the client device decrypts the content using at least one control word provided by a server device. Further, the invention relates to a client device and a server device for carrying out the method.

Content protection systems are essential with respect to the distribution of digital content via digital broadcast or through other channels. In such content protection systems, content is encrypted or scrambled (commonly referred to as encryption herein) before it is sent to the users, and the users decrypt or descramble (commonly referred to as decryption herein) the encrypted content in order to render the content. The cryptographic information, which is necessary for decrypting the content and which is referred to as control word herein, is provided to authorized users in a secure manner so that only such users are able to access and render the protected content.

In a specific configuration of such a system the content is "streamed" to the client device of the user. This means that the content can only be accessed in the client device once, immediately upon receipt of the content. However, the user is not authorized to access the content for a second time. This can be achieved by configuring the client device such that it does not store the content for a second access at a later time. However, an attacker may circumvent the prohibition to access the content again by recording the encrypted content and the associated control words during the transmission to the client device. This recorded copy of the content and the control words can be provided to the client device several times, and each time the client device would decrypt the content. Such attacks are usually also referred to as replay attacks.

It is an object of the present invention to prevent such replay attacks in connection with the streaming of content to a client device.

This object is achieved by a method, by a related device for accessing protected content, and by a related server device. Embodiments of the method and the devices are given in the claims.

According to one aspect, the invention suggests a method for accessing protected content provided in a client device. The client device decrypts the content using at least one control word provided by a server device. In the method, (i) the client device sends a request message to the server device, the request message including a nonce, and the client device stores the nonce; (ii) upon receipt of the request message, the server device generates a control word message based on the control word and the received nonce; (iii) upon receipt of the control word message, the client device determines a control word from the control word message and validates the control word message using the stored nonce; and (iv) a client device uses the control word to decrypt at least part of the content in response to a successful validation of the control word message.

In accordance with a further aspect, the invention suggests a device for accessing protected content. The device is configured to decrypt the content using at least one control word provided by a server device. Moreover, the device comprises a decryption module. In at least one mode of operation of the device, the decryption module is configured to (i) send a request message to the server device, the request message including a nonce, and to store the nonce in the decryption module; (ii) receive a control word message generated in the server device based on a control word and the received nonce; (iii) determine the control word from the control word message and to validate the control word message using the stored nonce; and (iv) use the control word to decrypt at least part of the content in response to a successful validation of the control word message.

In accordance with a still further aspect, the invention suggests a server device for providing at least one control word for decrypting protected content to a client device. The server device is configured to (i) receive from the client device a request message including a nonce; (ii) generate a control word message based on a control word and the nonce; and (iii) send the control word message to the client device.

It is an advantage of the invention that the client device retrieves the control word from the server device and is capable of validating that the control word is sent in a control word message as a response to the request message. For this purpose, a nonce is used, which is included in the request message and which is used for generating the alphanumeric string, particularly by a number, control word message. Thus, the client device can check whether the received control word is "fresh" and can reject control words as invalid, which already have been provided to the client device before. Hereby, replay attacks in which the content and the control word are provided to the client device again after the content already has been decrypted in the client device once, can be prevented.

The term nonce as used herein refers to an arbitrary number which is used only once. In particular, one nonce is only included in one request message and is used for validating only one control word message. In one implementation, the nonce comprises a random number generated in the client device or the decryption module included in the client device.

In one embodiment of the device, the decryption module is included in a secure module comprised in the device. Preferably, the secure module is a hardware block separated from further hardware of the device and has a special security architecture for protecting data stored in the secure module against unauthorized accesses from outside the secure module and protects operations executed in the secure module against tampering. Similar modules are also used in conventional devices for accessing protected content, and such modules typically dispose of functionality for generating nonce, particularly in the form of random numbers. This functionality can be reused for carrying out the invention.

Moreover, such secure modules typically only have a volatile memory and do not include non-volatile memory for storing data after the secure module or device has been switched off. In this respect, it is a further advantage of the invention that it only requires the temporary storage of the nonce and, thus, can be carried out in secure modules which do not have a non-volatile memory. In particular, it is not required to initialize the secure module with a certain predefined state in order to validate the control word message. For instance, it would be necessary to be able to initialize the secure module with a predefined state, if the control words would be provided with a serial number or similar freshness indication, because in this case, the secure module would have to memorize the used control words in order to check the freshness of newly received control words. In contrast, the invention makes it possible to dispense with such memorization.

In one embodiment of the invention, the control word message includes the control word in an encrypted form, and the client device decrypts the control word. A related embodiment provides that the control word message further includes the nonce and that the client device validates the nonce by comparing the nonce received in the control word message with the stored nonce. In a further related embodiment of the invention, the control word message includes the nonce in an encrypted form, and the client device decrypts the nonce to perform the validation. Preferably, the control word and the nonce are commonly encrypted using the same encryption key.

By encrypting the control word it can be prevented that the control word can be discovered during transmission of the control word message from the server device to the client device. Moreover, when the control word message includes the nonce in encrypted form, it can particularly be verified that the control word message originates from the server device that disposes of the necessary encryption key. This key may be a symmetric key which is shared between the server device and the client device, and the client device may use its copy of the key for decrypting the nonce and the control word.

In a further embodiment of the invention, the control word message includes a control word information generated in the server device based on the control word and the nonce by means of a reversible combination operation, and the client device determines the control word from the information and the stored nonce by means of a recovering operation reversing the combination operation. Here, the recovering operation is particularly the inverse of the combination operation with respect to a given nonce. In one implementation, the combination operation comprises a XOR operation. In this case, the recovering operation is likewise a XOR operation. However, other reversible operations are likewise suitable for calculating the control word information.

It is an advantage of these embodiments that the control word and the nonce do not have to be included in the control word message as separate data elements. Rather, the control word message does only have to include one data element corresponding to the result of the combination operation. This result does preferably have a smaller number of bits than the run of bits of the control word and the nonce. The validation of the control word message is implicitly made in this embodiment. In particular, it is only possible to determine the correct control word, when the control word message has been generated using the nonce stored in the client device and included in the request message. Otherwise, the correct control word cannot be determined and the protected content cannot be decrypted.

A related embodiment provides that the control word message includes the information in an encrypted form, where the client device decrypts the information. In this embodiment, the encryption again ensures that the control word message has been generated in the server device which disposes of the encryption key for carrying out the encryption.

In accordance with the aforementioned principles, at least one control word can be provided to the client device in a secure way. In one embodiment of the invention, the client device uses a series of successively provided control words for decrypting the content, where each control word is provided by the server device by means of a control word message as described above. This embodiment allows for changing the control word during the transmission of the protected content to the client device. Thus, there is not only one control word which can be used for decrypting the whole content. Rather, there is a plurality of control words and each control word can only be used for decrypting part of the content. Hereby, it is prevented that an attacker provides a copy of the whole content or a large part thereof to the client device to have this copy decrypted while the corresponding control word is still valid.

Furthermore, the secure provision of the control word to the client device is made in at least one mode of operation of the client device. One embodiment of the invention provides that the client device disposes of a further mode of operation. The further mode of operation of the device, the control word is provided to the device independent of a nonce, and the device is configured to decrypt the content using the control word without a validation regarding the control word. In a related embodiment, the further mode of operation is activated in dependence of usage rights associated with the content. The further mode of operation may particularly be selected, when the usage rights allow for storing the content in the device for a later playback. In this case, replay attacks are usually not harmful and, thus, it may be acceptable to dispense with measures for preventing such attacks.

The aforementioned and other aspects of the invention will also be apparent from and elucidated with reference to the embodiments described hereinafter making reference to the drawings in which.

Figure 1:
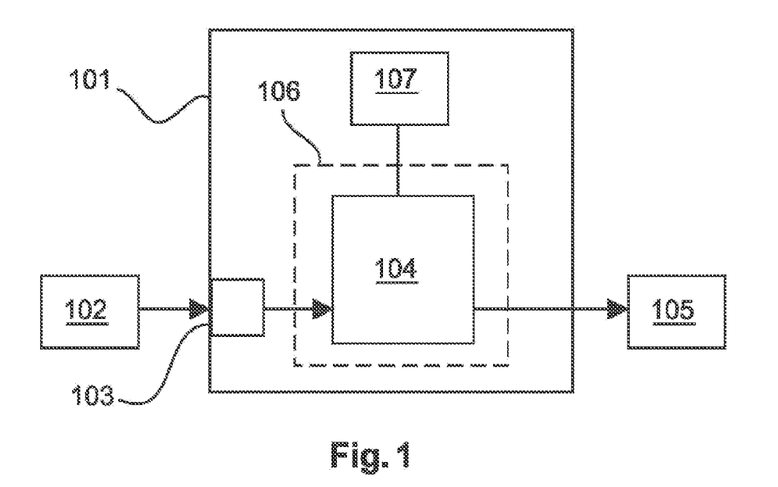
FIG. 1 is schematic depiction of a client device for accessing protected content provided by a server device.

FIG. 1 shows a client device 101 which is capable of accessing protected content and which may be configured as a set-top box, a module within a TV set, a personal computer or another appropriate multimedia device. In some implementations, the client device 101 may also be configured as a mobile multimedia device, such as, for example, a tablet computer or a notebook computer. The client device 101 is particularly operated such that the content is "streamed" to the client device 101. This means that the client device 101 directly renders the content or forwards the content to a further device 105 without storing the complete content in a non-volatile memory for future use. In addition, the client device 101 may be operable in such a way that it can store the content in a local memory, when such storage is allowed for the content.

The protected content may include audio and/or video programs, such as television programs, movies, pieces of music and the like. The content is provided by a server device 102 and transmitted to the client device 101 via a transmission connection. In one embodiment, the server device 102 transmits the protected content specifically to the client device 101. In this configuration, the transmission connection may include a suitable data connection, such as a wired and/or wireless data network. In further configurations, the server device 101 provides the same content to a plurality of client devices 101. This may also be done via a broadcast transmission connection which may comprise a satellite broadcast channel, a cable broadcast channel and/or a terrestrial radio broadcast channel, for example.

The protected content is transmitted to client device 101 in an encrypted and/or scrambled form (commonly referred to as encryption herein). The encryption is made in the server device 102 using a suitable encryption algorithm. In principle any content encryption algorithm known to a person skilled in the art can be applied for this purpose. In the client device 101 the protected content is descrambled or decrypted (commonly referred to as decryption herein) using decryption key which is also referred to as control word herein. The control word may be provided to the client device 101 by the server device 102 via the same transmission connection which is also used to transmit the content. In alternative embodiments, the control word may also be provided to the client device 101 by a further server device (not shown in the figures), which is separate from the server device 102 providing the content, and/or via a different transmission channel.

As will be explained in more detail herein below, the control words are provided to the client device 101 by means of control word messages sent from the server device 102 to the client device. Such control word messages may include the control word or information which allows the client device 101 to determine the control words from the messages. In order to prevent the control word messages from being read during their transmission from the server device 102 to the client device 101, the control word messages may be encrypted by the server device 102 and decrypted in the client device 101. The encryption is made on the basis of one or more cryptographic key(s) shared between the server device 102 and the client device 101. In one embodiment, the keys may be configured as symmetric keys. This means that the server device 102 and the client device 101 both dispose of a copy of the same key(s), where the server device 102 uses its copy of the key(s) to encrypt the control word messages and the client device 101 uses its copy of the key(s) to decrypt the control word messages. In further implementations, it is also possible to use one or more asymmetric key(s), where the encryption key(s) used in the server device 102 and the decryption key(s) used in the client device 101 are different.

The server device 102 may be operated by a content provider offering services for providing content, to which the user of the client device 101 has subscribed. In this case, the server device 102 performs a primary encoding of the protected content. In a further configuration, the server device 102 receives protected content from a content provider, decrypts the content and encrypts the content again in order to forward the content to the client device 101. This re-encryption of the content is preferably made on the basis of a different control word than the control word used for decrypting the content in the server device 101. Moreover, the re-encryption may be made on the basis of a different encryption scheme than the primary encryption by the content provider.

In the latter configuration, the server device 101 may particularly be operated by the user of the client device 101 as a primary device for receiving and accessing protected content. Here, the server device 102 may also be capable of rendering the content by means of a playback unit coupled to or integrated in the server device 101. The client device 101 to which the content is forwarded in a re-encrypted form may be a secondary device of the user for accessing and playing back the content. In this embodiment, both devices may be operated at the user's premises in this embodiment and may be connected via a local area network set up at the user's premises.

The client device 101 receives the protected content at a reception interface 103 suitable for receiving the content through the used transmission connection. Within the client device 101, the protected content is forwarded to a decryption module 104, which is capable of decrypting the protected content. For this purpose, the control word is provided to the decryption module 104 in addition to the protected content in a way to be described herein below. The control word may likewise be received at the reception interface 103 when transmitted via the same transmission channel as the protected content, or it may be received via another suitable reception interface of the client device 101 when it is transmitted through a separate transmission channel.

After the protected content has been decrypted in the decryption module 104, the client device 101 may provide the decrypted content for a direct playback. For this purpose, the decrypted content may be forwarded to a playback unit 105. The playback unit 105 may be a separate device directly coupled to the client device 101 through a suitable cable connection, such as, for example, an HDMI (High-Definition Multimedia Interface) connection. This may particularly be the case when the client device 101 is configured as a set-top box. As an alternative, the client device 101 and the playback unit 105 may be components of an integrated apparatus, such as, for example a TV set. In this case, the decrypted content is forwarded to the playback unit 105 through an appropriate internal connection of the integrated apparatus. The playback unit 105 may particularly include a display unit for outputting audio content and/or loudspeakers or there like for outputting audio content.

In addition or as an alternative, the client device 101 can be capable of forwarding the content to a further device (not shown in the figures) connected to the client device 101 through a suitable data connection, and the content may be rendered by the further device directly upon receipt of the content therein (i.e. the content is "streamed" to the further device). In order to forward the content to the further device, the client device 101 re-encrypts the content in a similar way as described above for one embodiment of the server device 101. Such re-encryption in the client device 101 when it receives primarily encrypted content from the server device 102 (i.e. when the server device 102 is operated by the content provider). Likewise, it may be made when the server device 102 has already decrypted and re-encrypted the content. In this case, the client device 101 re-encrypts the content a further time.

For carrying out the re-encryption of the content, the client device 101 may comprise a re-encryption module (also not shown in the figures). Upon having decrypted the content in the decryption module 104, the decryption module forwards the decrypted content to the re-encryption module. Then the re-encryption module encrypts the content again using a new control word using the same or a different encryption scheme. Thereupon, the client device 101 forwards the re-encrypted content to the further device.

The decryption module 104 of the client device 101 is included in a secure hardware environment 106 of the client device 101, which is also referred to as secure module herein. If the client device 101 disposes of re-encryption unit, this unit is preferably also included in the secure module 106. In this case, the secure hardware module particularly protects the decrypted content against unauthorized access when it is passed from the decryption module 104 to the re-encryption module.

The secure module 106 is preferably configured as a hardware module that includes a processor and memory for securely executing cryptographic operations and storing data used for carrying out such operations. The secure module 106 may be separated from further hardware of the client device 101 including one or more processors and volatile and non-volatile memory units for carrying out other functions of client device 101. In the secure module, operations may be implemented by means of a program code which is securely stored in the memory in such a way that it cannot be read or modified from outside the secure module 106. The program code may be stored in the secure module 106 in a secure manner at the time of its manufacturing. Moreover, the secure module 106 disposes of a special security architecture that protects operations executed by the processor from being manipulated from outside the secure module 106, and that ensures that data which are used in the operations executed in the secure module 106 and which are stored in the secure module 106 cannot be read or modified from outside the secure module 106.

Operations which are supported by the secure module 106 may comprise cryptographic operations including the decryption of data and encryption of data. Moreover, the secure module may be capable of validating data by means of digital signatures and other credentials and for creating such credentials. For this purpose, the secure module 106 may particularly be enabled to calculate hash values which may be included in such credentials. Moreover, the secure module 106 is capable of generating random or pseudo-random numbers. For this purpose, a random algorithm is implemented in the secure module 106. Here, any suitable random algorithm known to a person skilled in the art may be used.

The memory of the secure module 106 for storing use data (i.e. data other than the program code) data used in the operations executed therein includes a volatile memory. However, the secure module 106 may not include a re-programmable non-volatile memory. The secure integration of such a memory into the secure module 106 is usually not possible or very complex. In particular, the integration of functionality for managing a non-volatile memory significantly increase the complexity of chips which are designed to execute cryptographic operations, as it is the case for a chip forming the secure module 106. Therefore, it is usually not possible or not economic to produce secure modules 108 having such a memory.

In addition to the secure module 106, the client device 101 may comprise a control unit 107, which controls the operation of the client device 101 including the operation of the secure module 106. The control unit 107 receives user commands and controls their execution. Upon receiving respective user commands, the control unit 107 particularly instructs the secure module 106 to decrypt certain content received in the client device 107. If the client device 101 is enabled to re-encrypt content in a re-encryption module included in the secure module 106, the control unit 107 may likewise instruct the secure module 106 to re-encrypt content and to forward the content to a further device specified in the user commands. The instruction to the secure module 108 may be given by corresponding commands which may be sent from the control unit 107 to the secure module 108. The user commands may be entered by means of a suitable input means, such as a remote control unit and/or a keyboard connected to the client device 101. For interacting with the user, the client device 101 may also provide a graphical user interface at the playback unit 104, where the appearance and behavior of the graphical user interface may likewise be controlled by the control unit 107. In one embodiment, the control unit 107 is configured as software which is executed on a processor of the client device 101 outside the secure module 106.

As described above, protected content is particularly provided to the client device 101 by the server device 102 for streaming. That means the client device 101 does not store complete content files for a later playback, but directly renders the received content for a direct playback by means of the playback unit 105 or directly forwards the content to a further device in a re-encrypted form after its has been decrypted in the decryption module 104. Thus, the content cannot be accessed a second time after it has been decrypted in the decryption unit 104 once and after it has been passed to the playback unit 104 or forwarded to the further device. This behavior may be pre-configured in the client device 101, or the content may be provided together with usage rights information which do only permit streaming of the content and prohibit its storage.

The aforementioned behavior of the client device 101 ensures that the user of the client device 101 cannot access the protected content a second time after it has been decrypted in the decryption module 104 once, when he operates the client device 101 in the normal way. However, it may be possible for an attacker to record encrypted content and the associated control words during the transmission from the server device 102 to the decryption module 104. This recorded copy of the content and the control words could be provided to the decryption module 104 several times, and each time the decryption module 104 would decrypt the content if no further measures would be taken.

In order to prevent such replay attacks, the control words are provided from the server device 102 to the decryption module 104 within the scope of a special protocol. This protocol particularly allows the decryption module 104 to check the freshness of control words provided to the decryption module 104. In particular, the decryption module 104 can determine whether the control word is provided to the decryption module 104 for the first time. Using such a protocol for transmitting the control word from the server device 102 to the client device 101, the decryption module 104 does only decrypt the content when it determines that the control word is fresh and is received for the first time. Otherwise, the decryption module 104 blocks the decryption of the protected content.

In accordance with the aforementioned protocol, the decryption module 104 retrieves the control word from the server device 102 by means of a request message including a nonce. For providing the control word to the decryption module 104, the server device 102 generates a control word message from the control word and the received nonce and sends the control word message to the decryption module 104. Upon receipt of the control word message, the decryption module 104 determines the control word from the control word message and verifies that the control word message has been sent as a response to the previous request message. For this purpose, the decryption module 104 validates the control word message using the nonce which has been included in the request message and which is temporarily stored in the decryption module for validating the control word message. If the validation of the control word message is not successful, the decryption module 104 does not use the control word for decrypting the content. Thus, a valid control word can only be provided in a response message to a preceding request message sent by the decryption module 104. This ensures that older control words are not regarded as valid control words and cannot be used for decrypting content a second time.

Moreover, the control word is preferably changed during the transmission of content. In particular, one control word may only be valid for a certain period of time, which is also referred to as cryptoperiod herein. Such cryptoperiod may have a length between one second and several minutes. When the cryptoperiod for one control word is expired, the server device 102 encrypts the content using a new control word, and the new control word is provided to the client device 101 for decrypting the content. Thus, control words arte successively provided to the client device 101 in order to allow the decryption unit 105 of the client device 101 to decrypt the content.

The changes of the control word are particularly made to prevent a possible attack in which an attacker records the complete encrypted audio and/or video program included in the content or large parts thereof and lets the decryption module 104 decrypt this copy of the encrypted copy after it has decrypted the (original) content. Such an attack is possible as long as the control word for decrypting the content is available in the decryption module as a valid control word. Thus, an attacker can have the decryption module 104 decrypt a complete audio and/or video program included in the content several times when this program is decrypted using only one control words. When the control word is frequently changed, it is not possible to replay the whole program or just larger parts thereof in such a way. Rather, it would only be possible to replay small part of the program decrypted using the same control word and this does typically not have an advantage for an attacker.

When such changes of the control word are provided, the decryption module 104 does preferably retrieve each control word from the server device 102 and verifies its freshness on the basis of a respective nonce as explained above. Upon a successful verification of the freshness of a control word in the series of control words, the decryption unit 104 decrypts the content using the control word. Otherwise, the decryption module 104 blocks the decryption of content using the respective control word. During one cryptoperiod the decryption module 104 may retrieve and validate the control word(s) for decrypting the content in one or more future cryptoperiod(s). Thus, the control word for decrypting the protected in a certain cryptoperiod is already present in the decryption module 104 and can be used for decrypting content, when the cryptoperiod begins. This ensures a continuous decryption of the protected content. In particular, the decryption module may retrieve in each cryptoperiod the control word for decrypting the protected content in the next or next but one cryptoperiod. However, other configurations can also be realized.

In the following, exemplary embodiments of the protocol for retrieving and validating the control words will be described making reference to FIG. 2.

Figure 2:
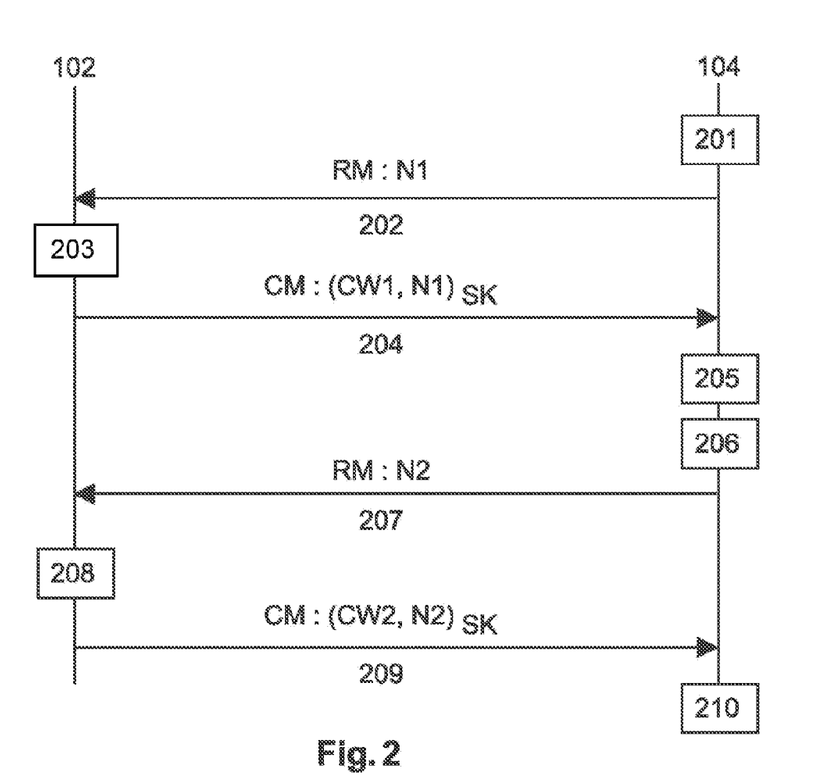
FIG. 2 is a schematic illustration of steps of a method for retrieving a control word in one embodiment.

In one implementation illustrated in FIG. 2, the decryption module 104 generates a nonce N1 in step 201 for retrieving a control word for the complete content or—when the control word changes—for a certain cryptoperiod. The nonce N1 may be a random number which is generated in the decryption module 104 using a suitable random algorithm. Upon having generated the nonce N1, the decryption module 104 generates a request message RM for retrieving a control word and includes nonce N1 in the request message RM. The request message is then transmitted to the server device 102 in step 202. In addition, decryption module stores a copy of the generated nonce in the memory of the secure module 106, which may be a volatile memory as explained above.

Regarding the transmission of the request message, the skilled person will recognize that it is not necessary to encrypt the nonce N1 or to protect the nonce in another way during transmission. Rather, the nonce N1 may be included in the request message in plain text. However, an encryption of the nonce N1 is of course possible.

When the server device 102 receives the request message RM including the nonce N1, it generates a control word message CM as a response to the request message RM in step 203. The control word message CM is generated on the basis of the received nonce N1 and the control word CW1 for decrypting the content. When the control word is changed as explained above, the server device 102 particularly generates the control word message on the basis of the control word CW1 for the cryptoperiod following the cryptoperiod for which it has transmitted the control word in the preceding control word message (or for the first cryptoperiod if no control word for the content has been transmitted to the client device 101 before).

In the embodiment illustrated in FIG. 2, the control word message CM includes the control word CW and the nonce N1. The control word and the nonce are included in the control word message CM in an encrypted form. The encryption is made on the basis of one or more cryptographic keys SK shared between the server device 102 and the decryption module 104. Preferably, only one shared cryptographic key SK is used, and the control word CW and the nonce N1 are commonly encrypted using this key. In FIG. 2, this encryption is illustrated by means of the round brackets (*) and their subscript SK. In other implementation it is likewise possible to encrypt the control word CW and the nonce N1 using different shared keys SK. For example, this may be useful when the decryption of the control word is made in another component of the server device 102 than the encryption of the nonce N1. The encryption of the control word message CW ensures that the control word cannot be discovered during the transmission of the message. Moreover, it is ensured that the control word message originates from the server device 102, when the message can be decrypted in the decryption module using the cryptographic key(s) shared between the decryption module 104 and the server device 102.

Upon having generated the control word message CM as describe above, the server device 102 sends the control word message CM to the client device 101 in step 204. Upon receipt of the control word message CM in the client device 101, the control word message CM is forwarded to the decryption module 104 within the client device 101. Then, the decryption module 104 decrypts the control word CW and the nonce N1 included in the control word message CM using the one or more shared keys in step 205. Thereupon, the decryption module 104 verifies the freshness of the control word CW. For this purpose, it compares the decrypted nonce included in the control word message with the stored copy of the nonce N1. If the received nonce N1 and the stored copy of the nonce N1 correspond to each other, the decryption module 104 determines that the control word is fresh, and uses the control word CW for decrypting the content in the cryptoperiod to which the request referred. Otherwise, the decryption module 104 determines that the control word CW is invalid and does preferably block the further decryption of the content.

When the control word changes during the transmission of the protected content, the decryption module 104 may then retrieve the next control word CW2 from the server device 101. In the implementation of the protocol illustrated in FIG. 2, this may be done at the beginning of the next cryptoperiod. As illustrated in the FIG. 2, the next control word CW2 is retrieved in the same way as the control word CW1, and the freshness of the control word CW2 is likewise checked as described above.

Thus, for retrieving the next control word CW2, the decryption module 104 generates a new nonce N2 in step 206. The nonce N2 is included in a further request message RM for retrieving the next control word, and the decryption module 104 stores the nonce N2 in the volatile memory of the secure module 106. Here, the nonce N2 may overwrite the nonce N1 which has previously been stored in the memory of the secure module, if the new nonce N2 is generated upon receipt of the control word CW1 and the validation of the corresponding control word message CW using the nonce N1. Further, the decryption module 104 sends the further request message RM including the nonce N2 to the server device 102 in step 207.

Upon receipt of the request message, the server device 102 generates a further control word message CM in step 208. The further control word message CM includes the next control word CW2 and the nonce N2 received in the request message RM in an encrypted form. The control word message is generated in an analogue way as the previous control word message for the control word CW1. Then, the server device 102 sends the control word message CM including the control word CW2 and the nonce N2 to the client device 101 in step 209. After the control word message has been forwarded to the decryption module 104 within the client device 101, the decryption module 104 decrypts the control word CW2 and the nonce N2 included in the control word message CM in step 210. Thereupon, it compares the decrypted nonce N2 with the stored copy of the nonce N2, and determines that the control word CW2 is fresh, when the received nonce N2 and the stored nonce N2 correspond to each other. Otherwise, the control word CW2 is not regarded as valid, and the decryption unit 105 blocks the further decryption of the protected content.

Further control words for decrypting the protected content in the following cryptoperiods are retrieved from the server device 102 in the same way and the freshness of these control words is likewise verified in the decryption module 104 as described above.

In a variant of the embodiment of the protocol described above, the control word messages generated in the server device 102 do not include the control word and the received nonce in an encrypted form. Rather, the server device 102 generates a control word information on the basis of the control word and the received nonce. In particular, the control word information is generated by means of a reversible combination operation for combining the control word and the nonce.

Also in this variant, the control word information may be encrypted in the server device 101 and transmitted to the client device 101 in an encrypted form. Hereby, it can again be ensured that the control word message originates from the server device 102 which disposes of the shared key for encrypting the control word message, and it can prevented that the control word information is discovered during the transmission from the server device 102 to the client device 101 and used by an attacker to determine the control word. Such a determination can be made when the attacker can discover the nonce in the previously sent request message. This is particularly possible when the nonce is included in the request message in an unprotected form.

In a further implementation, the nonce is transmitted from the decryption module 104 to the server device 102 in an encrypted form, and the encryption is made using a cryptographic key shared between the decryption module 104 and the server device 102. In this case, the control word information may also be included into the control word message in an unencrypted form. Here, an attacker cannot determine the control word from the control word information, because he cannot come into possession of the nonce. Moreover, it is also ensured in such an implementation that the control word message originates from the server device 102, because only the server device 102 is able to decrypt the nonce included in the request message and to calculate valid control word information using the decrypted nonce.

Upon having received the control word information and upon having decrypted the control word information in case it is provided in an encrypted form, the decryption module 104 uses the nonce stored in the secure module 106 to determine the control word from the control word information. In particular, the decryption module 104 executes a recovering operation using the control word information and the stored nonce in order to reverse the operation made in the server device 102. The result of this calculation corresponds to the control word.

As it is only possible to calculate the correct control word, when the control word information is generated on the basis of the nonce included in the request message and stored in the decryption module 104, the freshness of the control word is implicitly verified in this variant of the protocol. So, when the control word information has not been generated on the basis of the nonce in the previous request message, it is not possible to calculate the correct control word and, thus, it is not possible to decrypt the content in the next cryptoperiod.

The combination operation used for calculating the control word information I in the server device 102 is applied to the control word CW and the nonce C. Thus, it has the form f(N, CW)=I, where I denotes the control word information. This function is selected such that there is a function g which fulfills g(I, N')=g(f(N, CW), N')=CW in case N=N', where N corresponds to the nonce used by the server device 102 to calculate the control word information and N' corresponds to the nonce stored in the secure module 106. The function g corresponds to the recovering operation executed in the decryption module 104 to recover the control word from the control word information. Here, the function g is the inverse of the function f with respect to a given nonce N.

The control word and the nonce may be used in binary representations, each comprising a certain number of bits, and the combination operation is applied to the binary representations. Preferably, the control word information calculated using the combination operation has a smaller number of bits than the sum of the numbers of bits of the control word and the nonce. This does particularly reduce the amount of data to be included in the control word message. In particular, the control word information may have the same number of bits as the control word itself.

Further, the recovering operation g does preferably produce different results for different nonces N' and a given control word information I. Hereby, it is ensured that the correct control word can only be recovered when the nonce stored in the secure module 106 and the nonce used for calculating the control word information correspond to each other. Similarly, the combination operation f preferably produces different results for different nonces N and a given control word CW. Furthermore, it is preferable that the combination operation produces different results for different values of the control word and for a given nonce N.

One example of a combination operation is an XOR operation applied to the control word and the nonce in binary format. Thus, the control word information I is calculated in accordance with the formula I=CW XOR N on the basis of the control word CW and the nonce N received in the server device 102. In this case, the decryption module 104 likewise calculates the control word CW from the control word information I using an XOR operation. In particular, it calculates the control word CW in accordance with the formula CW=I XOR N' using the stored nonce N'. If the stored nonce N' and the nonce N used in the server device 102 for calculating the control word information correspond to each, the decryption module 104 can recover the correct control word in this manner.

In a further variant of the protocol for preventing replay attacks, the control word message includes the control word in an encrypted form, where the server device 102 determines the encryption function for encrypting the control word based on the nonce included in the received request message transmitted by the client device 101. Here, the nonce is a further input parameter of the encryption function in addition the secret key shared between the server device 102 and the decryption module 104. Similarly, the decryption module 104 determines the decryption function for decrypting the control word based on the stored nonce. The nonce is a further input parameter to the decryption function in addition to the secret key.

In this embodiment, it is only possible to correctly decrypt the control word when the encryption function and the decryption function are determined based on the same nonce. Thus, the decryption module 104 implicitly verifies the freshness of the control word when being able to correctly decrypt the control word using the stored nonce.

In accordance with the embodiments describe above, one control word or a series of control words can be securely transmitted to the client device 101 the content is streamed to the client device 101. The client device 101 may be configured such that this is the only mode of operating the client device 101.

In a further embodiment, the client device 101 can also be operated such that it can store the content locally for a later playback in case storage is allowed for the content and the user of the client device 101 provides a corresponding instruction to the client device 101. For storing the content, the client device 101 preferably re-encrypts the content in the re-encryption unit as explained above in connection with the forwarding of the content to another device. Then, the re-encrypted content is stored in a local memory. Here, the complete audio and/or video program included in the content is stored in the memory. The control word for decrypting the content may likewise be stored in an encrypted form, and may be decrypted in order to access the content again at a later time. This may be done in the decryption module 104 or another decryption module of the client device 101, and the encryption and decryption of the control word may be made using a secret key shared between the re-encryption module and the respective decryption module.

When the client device 101 is allowed to store the content, a validation regarding the control word or series of control words provided by the server device 102 may be dispensed with. The reason is that a replay attack of the kind described above is usually no threat, when it is allowed to store the content in the client device 101.

Thus, the server device 102 may transmit the control word or the series of control words for decrypting the content in the decryption module 104 independent of a nonce transmitted by the client device 101. Further, the server device 102 may transmit the control word(s) on its own initiative. A request message of the client device 101 for transmitting the control word(s) may be dispensed with in this mode of operation. Moreover, the decryption module 104 decrypts the content without a validation regarding the control word. A nonce is not generated and used in this mode of operation.

In case the client device 101 supports both modes of operation, i.e. a mode involving the validation of control word message using a nonce and a mode in which the validation is dispensed with, the used mode may be activated upon an evaluation of the usage rights associated with the content. In particular, the mode involving the validation of control word message may be activated, if the usage rights do no permit storing the content in the client device 101. Otherwise, the operation mode without the validation may be activated.

The evaluation of the usage rights may be made in the client device 101. For this purpose, the client device 101 may be provided with the usage rights by the server device 102 before the server device 102 provides the content, for example. When client device 101 determines as a result of the evaluation the usage rights do not allow for storing the content it activates the operation mode involving the control word validation. Otherwise, it activates the operation mode in which no validation is made for the control word(s). Further, the client device 101 may inform the server device 102 so that the server device 102 can also be adapted to the selected mode of operation. In an alternative embodiment, the server device 102 may determine the usage rights and instruct the client device 101 to activate the corresponding mode of operation. For this purpose, the server device 102 may securely transmit a corresponding control message to the client device 101 which specifies the mode the client device 101 is to be operated in. Upon receipt of this message, the client device 101 sets the mode of operation accordingly.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

Various embodiments are described in the following clauses.

1. Method for accessing protected content provided to a client device, wherein the client device decrypts the content using at least one control word provided by a server device and wherein:
   the client device sends a request message to the server device, the request message including a nonce, and the client device stores the nonce;
   upon receipt of the request message, the server device generates a control word message based on the control word and the received nonce;
   upon receipt of the control word message, the client device determines the control word from the control word message and validates the control word message using the stored nonce; and the client device uses the control word to decrypt at least part of the content in response to a successful validation of the control word message.

2. Method as in clause 1, wherein the control word message includes the control word in an encrypted form, and the client device decrypts the control word.

3. Method as in clause 2, wherein the control word message further includes the nonce, and wherein the client devices validates the nonce by comparing the nonce received in the control word message with the stored nonce.

4. Method as in clause 3, wherein the control word message includes the nonce in an encrypted form, and the client device decrypts the nonce to perform the validation.

5. Method as in one of the clauses 2-4, wherein the control word and the nonce are commonly encrypted using the same encryption key.

6. Method as in clause 1, wherein the control word message includes an information generated in the server device based on the control word and the nonce by means of a reversible combination operation, and wherein the client device determines the control word from the information and the stored nonce by means of a recovering operation reversing the combination operation.

7. Method as in clause 6, wherein the control word message includes the information in an encrypted form, and wherein the client device decrypts the information.

8. Method according to one of the preceding clauses, wherein the nonce comprises a random number generated in the client device.

9. Method according to one of the preceding clauses, wherein the client device uses a series of successively provided control words for decrypting the content, each control word being provided by the server device by means of a control word message.

10. Device for accessing protected content, wherein the device is configured to decrypt the content using at least one control word provided by a server device and wherein the device comprises a decryption module which is, in at least one mode of operation of the device, configured to send a request message to the server device, the request message including a nonce, and to store the nonce in the decryption module;

receive a control word message generated in the server device based on the control word and the received nonce;

determine the control word from the control word message and to validate the control word message using the stored nonce; and use the control word to decrypt at least part of the content in response to a successful validation of the control word message.

11. Device as in clause 12, wherein the decryption module is included in a secure module comprised in the device.

12. Device as in clause 10 or 11, wherein, in a further mode of operation of the client device, the control word is provided to the client device independent of a nonce, and the client device is configured to decrypt the content using the control word without a validation regarding the control word.

13. Device as in clause 12, wherein the further mode of operation is activated in dependence of usage rights associated with the content.

14. Server device for providing at least one control word for decrypting protected content to a client device, the server device being configured to receive from the client device a request message including a nonce;

generate a control word message based on the control word and the nonce; and send the control word message to the client device.

15. System comprising a device as in clause 12 or 13 and further comprising a server device as in clause 14.

The invention claimed is:

1. Method for accessing protected content including an audio and/or video program and provided to a client multimedia device, wherein the client multimedia device is capable of decrypting the content using a plurality of control words provided by a server device, wherein each control word of the plurality of control words is valid for a period of time, and wherein:

a secure module of the client multimedia device, which comprises a secured processor and a secured memory, generates a nonce and includes the nonce in a request message and stores the nonce in the memory, the client multimedia device sends the request message including the nonce to the server device;

upon receipt of the request message, the server device generates control word information based on the control word and the received nonce by means of a reversible combination operation combining the control word and the nonce, the control word information having a smaller number of bits than the sum of the numbers of bits of the control word and the nonce, and the server device sends a control word message including the control word information to the client multimedia device;

upon receipt of the control word message in the client multimedia device, the secure module determines the control word from the control word information using the stored nonce by means of a recovering operation reversing the combination operation;

the secure module decrypts at least part of the content using the control word thereby verifying a freshness of the control word;

the secure module retrieves, during the valid period of time for the determined control word, a control word for a future period of time; and the secure module forwards the decrypted content to a playback unit for rendering the included audio and/or video program.

2. Method according to claim 1, wherein the control word information includes the control word in an encrypted form, and the client multimedia device decrypts the control word, the control word being encrypted and decrypted on the basis of the nonce and a key shared between the server device and the client multimedia device.

3. Method according to claim 1, wherein the nonce comprises a random number generated in the client multimedia device.

4. Method according to claim 1, wherein the client multimedia device uses a series of successively provided control words for decrypting the content, each control word being provided by the server device by means of a control word message.

5. Multimedia device for accessing protected content including an audio and/or video program, wherein the multimedia device is configured to decrypt the content using a plurality of control words provided by a server device, wherein each control word of the plurality of control words is valid for a period of time, and wherein the multimedia device comprises a secure module which comprises a secured processor and a secured memory and which is, in at least one mode of operation of the multimedia device, configured to:

generate a nonce and to include the nonce into a request message sent to the server device and to store the nonce in the memory;

receive control word information generated in the server device based on the control word and the received nonce by means of a reversible combination operation combining the control word and the nonce, the control word information having a smaller number of bits than the sum of the numbers of bits of the control word and the nonce;

determine the control word from the control word information using the stored nonce by means of a recovering operation reversing the combination operation;

decrypt at least part of the content using the determined control word thereby verifying a freshness of the control word;

retrieve, during the valid period of time for the determined control word, a control word for a future period of time; and forward the decrypted content to a playback unit for rendering the included audio and/or video program.

6. Multimedia device according to claim 5, wherein a decryption module is included in a secure module comprised in the multimedia device.

7. Multimedia device according to claim 5, wherein, in a further mode of operation of the multimedia device, the control word is provided to the multimedia device independent of a nonce, and the multimedia device is configured to decrypt the content using the control word without a validation regarding the control word.

8. Multimedia device according to claim 6, wherein, in a further mode of operation of the multimedia device, the control word is provided to the multimedia device independent of a nonce, and the multimedia device is configured to decrypt the content using the control word without a validation regarding the control word.

9. Multimedia device according to claim 7, wherein the further mode of operation is activated in dependence of usage rights associated with the content.

10. Multimedia device according to claim 8, wherein the further mode of operation is activated in dependence of usage rights associated with the content.

11. Server device for providing a plurality of control words for decrypting protected content including an audio and/or video program to a client multimedia device that comprises a secure module which comprises a secured processor and a secured memory, wherein each control word of the plurality of control words is valid for a period of time, the server device being configured to:

receive from the client multimedia device a request message including a nonce generated in the secure module of the client multimedia device and stored in the secured memory of the client multimedia device;

generate control word information based on the control word and the nonce by means of a reversible combination operation combining the control word and the nonce, the control word information having a smaller number of bits than the sum of the numbers of bits of the control word and the nonce; and send a control word message including the control word information to the client multimedia device, the client multimedia device configured to:

determine the control word from the control word information using the stored nonce by means of a recovering operation reversing the combination operation;

decrypt at least part of the content using the determined control word thereby verifying a freshness of the control word;

retrieve, during the valid period of time for the determined control word, a control word for a future period of time; and forward the decrypted content to a playback unit for rendering the included audio and/or video program.

12. System comprising:

a client multimedia device for accessing protected content including an audio and/or video program and a server device, wherein the client multimedia device is configured to decrypt the content using a plurality of control words provided by the server device, wherein each control word of the plurality of control words is valid for a period of time, and wherein the client multimedia device comprises a secure module which comprises a secured processor and a secured memory and which is, in at least one mode of operation of the client multimedia device, configured to:

generate a nonce and include the nonce into a request message to the server device and to store the nonce in a decryption module;

receive control word information generated in the server device based on the control word and the received nonce by means of a reversible combination operation combining the control word and the nonce, the control word information having a smaller number of bits than the sum of the numbers of bits of the control word and the nonce;

determine the control word from the control word information using the stored nonce by means of a recovering operation reversing the combination operation;

retrieve, during the valid period of time for the determined control word, a control word for a future period of time decrypt at least part of the content using the determined control word thereby verifying a freshness of the control word; and forward the decrypted content to a playback unit for rendering the included audio and/or video program, and wherein the server device is configured to:

receive from the client multimedia device the request message including the nonce;

generate the control word information based on the control word and the nonce by means of the reversible combination operation combining the control word and the nonce; and send a control word message including the control word information to the client multimedia device.

* * * * *